(12) United States Patent
Paczkowski et al.

(10) Patent No.: US 9,066,230 B1
(45) Date of Patent: Jun. 23, 2015

(54) TRUSTED POLICY AND CHARGING ENFORCEMENT FUNCTION

(75) Inventors: Lyle W. Paczkowski, Mission Hills, KS (US); William M. Parsel, Overland Park, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 363 days.

(21) Appl. No.: 13/533,969

(22) Filed: Jun. 27, 2012

(51) Int. Cl.
*H04M 3/16* (2006.01)
*H04W 12/06* (2009.01)

(52) U.S. Cl.
CPC ..................................... *H04W 12/06* (2013.01)

(58) Field of Classification Search
CPC .................. H04W 4/24; H04W 4/26
USPC .............. 455/411, 418, 422.1, 420, 424, 445, 455/435.2, 436, 444, 406
See application file for complete search history.

(56) References Cited

U.S. PATENT DOCUMENTS

| | | | |
|---|---|---|---|
| 5,303,378 A | 4/1994 | Cohen | |
| 5,796,952 A | 8/1998 | Davis et al. | |
| 6,131,024 A * | 10/2000 | Boltz | 455/405 |
| 6,219,712 B1 | 4/2001 | Mann et al. | |
| 6,477,180 B1 | 11/2002 | Aggarwal et al. | |
| 6,668,322 B1 | 12/2003 | Wood et al. | |
| 6,691,230 B1 | 2/2004 | Bardon | |
| 6,754,784 B1 | 6/2004 | North et al. | |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,387,240 B2 | 6/2008 | Ziegler | |
| 7,552,467 B2 | 6/2009 | Lindsay | |
| 7,571,364 B2 | 8/2009 | Whetsel | |
| 7,650,645 B1 | 1/2010 | Langendorf et al. | |
| 7,873,837 B1 | 1/2011 | Lee et al. | |
| 7,895,642 B1 | 2/2011 | Larson et al. | |
| 7,921,303 B2 | 4/2011 | Mauro, II | |
| 8,060,449 B1 | 11/2011 | Zhu | |
| 8,073,428 B2 | 12/2011 | Khetawat et al. | |
| 8,086,238 B1 | 12/2011 | Kosar | |
| 8,190,919 B2 | 5/2012 | Natarajan et al. | |
| 8,204,480 B1 | 6/2012 | Lindteigen et al. | |
| 8,238,823 B2 | 8/2012 | Maugars et al. | |
| 8,271,336 B2 | 9/2012 | Mikurak | |

(Continued)

FOREIGN PATENT DOCUMENTS

| | | | |
|---|---|---|---|
| WO | WO2011025433 A1 | 3/2011 | |
| WO | 2013170228 A2 | 11/2013 | |

(Continued)

OTHER PUBLICATIONS

Advisory Action dated Jun. 23, 2014, U.S. Appl. No. 13/571,348, filed Aug. 10, 2012.

(Continued)

*Primary Examiner* — Babar Sarwar

(57) ABSTRACT

A system for policy and charging enforcement function on a mobile access terminal. The system comprises a radio transceiver, a processor, a memory, and an application stored in the memory. The application stored in the memory, when executed by the processor, receives policy and charging rules via the radio transceiver, and enforces the policy and charging rules when the mobile access terminal initiates a wireless communication.

12 Claims, 7 Drawing Sheets

(56) References Cited

U.S. PATENT DOCUMENTS

| | | |
|---|---|---|
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,954,588 B1 | 2/2015 | Bertz et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0052994 A1 | 3/2005 | Lee |
| 2005/0091505 A1 | 4/2005 | Riley et al. |
| 2005/0138433 A1 | 6/2005 | Linetsky |
| 2005/0235166 A1 | 10/2005 | England et al. |
| 2005/0239481 A1 | 10/2005 | Seligmann |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdznski |
| 2007/0118880 A1 | 5/2007 | Mauro, II |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0182634 A1 | 7/2009 | Park et al. |
| 2009/0193491 A1 | 7/2009 | Rao |
| 2009/0271321 A1 | 10/2009 | Stafford |
| 2009/0281947 A1 | 11/2009 | Erel |
| 2009/0300599 A1 | 12/2009 | Piotrowski |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1* | 5/2010 | Liu et al. .................. 455/411 |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Florek et al. |
| 2011/0113479 A1 | 5/2011 | Ganem |
| 2011/0138064 A1 | 6/2011 | Rieger et al. |
| 2011/0145926 A1 | 6/2011 | Dalcher et al. |
| 2011/0154032 A1 | 6/2011 | Mauro, II |

(56) References Cited

U.S. PATENT DOCUMENTS

| | | |
|---|---|---|
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0191632 A1 | 7/2013 | Spector et al. |
| 2013/0212704 A1 | 8/2013 | Shablygin et al. |
| 2013/0262264 A1 | 10/2013 | Karstoft Jens |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347103 A1 | 12/2013 | Veteikis et al. |
| 2014/0033316 A1 | 1/2014 | Paczkowski et al. |
| 2014/0047548 A1 | 2/2014 | Bye et al. |
| 2014/0074508 A1 | 3/2014 | Ying et al. |
| 2014/0155025 A1 | 6/2014 | Parker et al. |
| 2014/0188738 A1 | 7/2014 | Huxham |
| 2014/0245444 A1 | 8/2014 | Lutas et al. |
| 2014/0254381 A1 | 9/2014 | Racz et al. |
| 2014/0279558 A1 | 9/2014 | Kadi et al. |
| 2014/0281544 A1 | 9/2014 | Paczkowski et al. |

FOREIGN PATENT DOCUMENTS

| | | |
|---|---|---|
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Notice of Allowance dated Jun. 4, 2014, U.S. Appl. No. 13/557,213, filed Jul. 25, 2012.

FAIPP Pre-Interview Communication dated Aug. 4, 2014, U.S. Appl. No. 13/844,357, filed Mar. 15, 2013.

Notice of Allowance dated Jul. 8, 2014, U.S. Appl. No. 13/802,383, filed Mar. 13, 2013.

Restriction Requirement dated Aug. 14, 2014, U.S. Appl. No. 13/594,777, filed Aug. 25, 2012.

Faipp Pre-Interview Communication dated Jul. 17, 2014, U.S. Appl. No. 13/594,778, filed Aug. 25, 2012.

Faipp Pre-Interview Communication dated Jul. 17, 2014, U.S. Appl. No. 13/594,779, filed Aug. 25, 2012.

Office Action dated May 5, 2014, U.S. Appl. No. 13/786,450, filed Mar. 5, 2013.

Faipp Pre-Interview Communication dated Aug. 6, 2014, U.S. Appl. No. 13/831,486, filed Mar. 14, 2013.

Ahmed, Farid, et al., "Correlation-based Watermarking Method for Imagine Authentication Applications", Society of Photo-Optical Instrumentation Engineers, Feb. 17, 2004, pp. 1834-1838.

Foreign Communication from a Related Counterpart—International Search Report and Written Opinion, dated Jul. 11, 2014, PCT/US14/16651, filed on Feb. 16, 2014.

Kunkel, Philip M., et al., "Secure Peer-to-Peer Call Forking Facilitated by Trusted 3rd Party Voice Server Provisioning", filed Oct. 29, 2013, U.S. Appl. No. 14/066,661.

Bertz, Lyle T., et al., "Framework for Real-Time Brokering of Digital Content Delivery," filed Aug. 25, 2012, U.S. Appl. No. 13/594,777.

Bertz, Lyle T., et al.,"Reservations in Real-Time Brokering of Digital Content Delivery," filed Aug. 25, 2012, U.S. Appl. No. 13/594,778.

Bertz, Lyle T., et al., "File Retrieval in Real-Time Brokering of Digital Content Delivery," filed Aug. 25, 2012, U.S. Appl. No. 13/594,779.

(56) References Cited

OTHER PUBLICATIONS

Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed on Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed on Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed on Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed on Apr. 4, 2013, U.S. Appl. No. 13/857,138.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.

(56) References Cited

OTHER PUBLICATIONS

Paczkowski, Lyle W., et al., "Mobile Access Terminal with Local Call Session Control Function", filed Jun. 18, 2009, U.S. Appl. No. 12/486,873.

Zimmerman, Ann, "Check Out the Future of Shopping", The Wall Street Journal, Business, May 18, 2011, http://online.wsj,com/article/SB10001424052748703421204576329253050634700.html.

Garry, Michael, Kroger Test Prepares for Mobile Future:, SN, Supermarket News, Jun. 13, 2011, http://supermarketnews.com/technology/kroger-test-prepares-mobile-future.

Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.

Notice of Allowance dated Nov. 29, 2013, U.S. Appl. No. 13/440,980, filed Apr. 5, 2012.

Office Action dated Dec. 19, 2013, U.S. Appl. No. 13/557,213 filed Jul. 25, 2012.

FAIPP Pre-Interview Communication dated Nov. 27, 2013, U.S. Appl. No. 13/610,856 filed Sep. 11, 2012.

Notice of Allowance date Jan. 31, 2014, U.S. Appl. No. 13/610,856 filed Sep. 11, 2012.

Cope, Warren B., et al., "Extended Trusted Security Zone Radio Modem", filed Nov. 26, 2013, U.S. Appl. No. 14/090,667.

Paczkowski, Lyle W., et al., "Trusted Security Zone Containers for the Protection and Confidentiality of Trusted Service Manager Data", filed Feb. 16, 2014, PCT Application No. PCT/US14/16651.

Foreign Communication from a Related Counterpart—International Search Report and Written Opinion, dated Dec. 2, 2013, PCT/US13/40673, filed on May 10, 2013.

Giesecke & Devrient, "The OTA Platform in the World of LTE", Jan. 2011, http://www.gi-de.com/gd_media/media/en/documents/brochures/mobile_security_2/cste_1/OTA-and-LTE.pdf.

Pesonen, Lauri, "Development of Mobile Payment Ecosystem—NFC Based Payment Services", Aug. 27, 2008.

Foreign Communication from a Related Counterpart—International Search Report and Written Opinion, dated Feb. 4, 2014, PCT/US13/47729, filed on Jun. 25, 2013.

Foreign Communication from a Related Counterpart—International Search Report and Written Opinion, dated Feb. 4, 2014, PCT/US13151750, filed on Jul. 24, 2013.

Final Office Action dated Sep. 9, 2013, U.S. Appl. No. 13/440,980, filed Apr. 5, 2012.

Office Action dated Sep. 25, 2013, U.S. Appl. No. 13/571,348, filed Aug. 10, 2012.

Notice of Allowance dated Aug. 30, 2013; U.S. Appl. No. 13/540,437, filed Jul. 2, 2012.

Restriction Requirement dated Nov. 1, 2013, U.S. Appl. No. 13/557,213 filed Jul. 25, 2012.

Notice of Allowance dated Oct. 16, 2013, U.S. Appl. No. 13/556,200, filed Jul. 24, 2012.

FAIPP Pre-Interview Communication dated Mar. 20, 2014, U.S. Appl. No. 13/482,731, filed May 29, 2012.

Final Office Action dated Mar. 27, 2014, U.S. Appl. No. 13/470,203, filed May 11, 2012.

Notice of Allowance dated Jan. 28, 2014, U.S. Appl. No. 12/486,873, filed Jun. 18, 2009.

Paczkowski, Lyle W., et al., "Trusted Security Zone Access to Peripheral Devices", filed Jan. 6, 2014, U.S. Appl. No. 14/148,714.

Notice of Allowance dated May 27, 2014, U.S. Appl. No. 13/482,731, filed May 29, 2012.

Advisory Action dated May 29, 2014, U.S. Appl. No. 13/470,203, filed May 11, 2012.

FAIPP Pre-Interview Communication dated May 12, U.S. Appl. No. 13/294,177, filed Nov. 11, 2011.

Final Office Action dated Apr. 10, 2014, U.S. Appl. No. 13/571,348, filed Aug. 10, 2012.

FAIPP Pre-Interview Communication dated Apr. 3, 2014, U.S. Appl. No. 13/802,383, filed Mar. 13, 2013.

First Action Interview Office Action dated May 23, 2014, U.S. Appl. No. 13/802,383, filed Mar. 13, 2013.

Foreign Communication from a Related Counterpart—International Search Report and Written Opinion, dated Apr. 22, 2014, PCT/US13/53617, filed on Aug. 5, 2013.

Office Action dated Aug. 29, 2014, U.S. Appl. No. 13/470,203, filed May 11, 2012.

Notice of Allowance dated Oct. 8, 2014, U.S. Appl. No. 13/294,177, filed Nov. 11, 2011.

Notice of Allowance dated Oct. 6, 2014, U.S. Appl. No. 13/844,357, filed Mar. 15, 2013.

FAIPP Pre-Interview Communication dated Nov. 12, 2014, U.S. Appl. No. 13/844,145, filed Mar. 15, 2013.

Notice of Allowance dated Sep. 19, 2014, U.S. Appl. No. 13/594,778, filed Aug. 25, 2012.

Final Office Action dated Nov. 7, 2014, U.S. Appl. No. 13/786,450, filed Mar. 5, 2013.

Notice of Allowance dated Sep. 26, 2014, U.S. Appl. No. 13/831,486, filed Mar. 14, 2013.

FAIPP Pre-Interview Communication dated Nov. 7, 2014, U.S. Appl. No. 13/802,404, filed Mar. 13, 2013.

FAIPP Pre-Interview Communication dated Oct. 29, 2014, U.S. Appl. No. 13/844,282, filed Mar. 15, 2013.

FAIPP Pre-Interview Communication dated Oct. 21, 2014, U.S. Appl. No. 13/844,325, filed Mar. 15, 2013.

Foreign Communication from a Related Counterpart—International Preliminary Report on Patentability, dated Nov. 20, 2014, PCT/US13/40673, filed on May 10, 2013.

Perrig, Adrian, et al., "SPINS: Security Protocols for Sensor Networks," ACM, Sep. 2002, vol. 8, pp. 521-534.

Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.

Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.

Notice of Allowance dated Dec. 22, 2014, U.S. Appl. No. 13/470,203, filed May 11, 2012.

Office Action dated Dec. 15, 2014, U.S. Appl. No. 13/571,348, filed Aug. 10, 2012.

Restriction Requirement dated Jan. 2, 2015, U.S. Appl. No. 13/762,319, filed Feb. 7, 2013.

FAIPP Pre-Interview Communication dated Feb. 12, 2015, U.S. Appl. No. 14/066,661, filed Oct. 29, 2013.

Notice of Allowance dated Dec. 3, 2014, U.S. Appl. No. 13/594,777, filed Aug. 25, 2012.

First Action Interview Office Action dated Dec. 3, 2014, U.S. Appl. No. 13/594,779, filed Aug. 25, 2012.

Notice of Allowance dated Feb. 26, 2015, U.S. Appl. No. 13/786,450, filed Mar. 5, 2013.

FAIPP Pre-Interview Communication dated Dec. 16, 2014, U.S. Appl. No. 13/898,435, filed May 20, 2013.

Notice of Allowance dated Feb. 20, 2015, U.S. Appl. No. 13/898,435, filed May 20, 2013.

Notice of Allowance dated Dec. 19, 2014, U.S. Appl. No. 13/844,325, filed Mar. 15, 2013.

Notice of Allowance dated Jan. 2, 2015, U.S. Appl. No. 13/831,463, filed Mar. 14, 2013.

FAIPP Pre-Interview Communication dated Feb. 4, 2015, U.S. Appl. No. 14/075,663, filed Nov. 8, 2013.

FAIPP Pre-Interview Communication dated Feb. 25, 2015, U.S. Appl. No. 14/163,047, filed Jan. 24, 2014.

Restriction Requirement dated Jan. 5, 2015, U.S. Appl. No. 13/857,139, filed Apr. 4, 2013.

(56) References Cited

OTHER PUBLICATIONS

Foreign Communication from a Related Counterpart—International Preliminary Report on Patentability, dated Jan. 8, 2015, filed on Jun. 25, 2013.

Foreign Communication from a Related Counterpart—International Preliminary Report on Patentability, dated Feb. 19, 2015, PCT/US13/53617, filed on Aug. 5, 2013.

Foreign Communication from a Related Counterpart—International Preliminary Report on Patentability, dated Feb. 5, 2015, PCT/US13/51750, filed on Jul. 24, 2013.

Katzer, Robin D., et al., "Web Server Bypass of Backend Process on Near Field Communications and Secure Elements Chips", filed Feb. 26, 2015, U.S. Appl. No. 14/632,850.

Neson, Tracy L., et al., "Mated Universal Serial Bus (USB) Wireless Dongles Configured with Destination Addresses", filed Jan. 26, 2015, U.S. Appl. No. 14/606,011.

Paczkowski, Lyle W., et al., "Trusted Code Generation and Verification to Prevent Fraud from Maleficent External Devices that Capture Data", filed Jan. 14, 2015, U.S. Appl. No. 14/592,218.

* cited by examiner

TRUSTED POLICY AND CHARGING ENFORCEMENT FUNCTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

IP Multimedia Subsystem (IMS) is a framework for adding multimedia services to mobile communication networks to support delivery of Internet Protocol (IP) services and aid the access of multimedia and voice applications from wireless and wireline networks to create a convergence between fixed networks and mobile networks. IP Multimedia Subsystem provides a control layer that isolates the access network from the service layer. This control layer allows network operators to provide multimedia services in a scalable, centralized manner.

Long Term Evolution (LTE) is a standard for wireless communication of high-speed data for mobile phones and data terminals. Long Term Evolution is an evolution of the Global System for Mobile Communications (GSM) and Universal Mobile Telecommunications System (UMTS). Long Term Evolution was designed to increase the capacity and speed of wireless data networks using new digital signaling processing (DSP) and modulation techniques and a simplification of the network architecture to an Internet Protocol-based system. The Long Term Evolution wireless interface is incompatible with the previous standards and must be operated on a separate wireless spectrum.

SUMMARY

In an embodiment, a system for policy and charging enforcement function on a mobile access terminal is disclosed. The system comprises a radio transceiver, a processor, a memory, and an application stored in the memory. The application stored in the memory, when executed by the processor, receives policy and charging rules via the radio transceiver, and enforces the policy and charging rules when the mobile access terminal initiates a wireless communication.

In an embodiment, a method of trusted policy and charging enforcement function is disclosed. The method comprises establishing a wireless communication link between a mobile access terminal and a policy server. A trusted security zone in the mobile access terminal is coupled with a trusted security zone in the policy server. Credentials are transmitted from a policy and charging enforcement function application residing in the trusted security zone on the mobile access terminal to a policy and charging rules function application residing on the policy server, where the credential is used to establish trust between the mobile access terminal and the policy server. Policy rules are transmitted from the policy and charging rules function application on the policy server to the policy and charging enforcement function application on the mobile access terminal. The received policy rules are enforced by the policy and charging enforcement function application on the mobile access terminal.

In an embodiment, a method of monitoring and rating network usage on a mobile access terminal is disclosed. The method comprises establishing a first wireless communication link between a mobile access terminal and a policy server on a first wireless network. Policy rules are received by a policy and charging enforcement function application on the mobile access terminal from a policy and charging rules function application on the policy server on the first wireless network. A second wireless communication link is established between the mobile access terminal and a second wireless network. The activity of the mobile access terminal on the second wireless network is monitored by the policy and charging enforcement function application on the mobile access terminal, where monitoring the activity of the mobile access terminal comprises counting the amount of data usage on the second wireless network. An amount of data usage by the mobile access terminal on the second wireless network is monitored by the second wireless network. The amount of data usage on the second network by the mobile access terminal is transmitted by the policy and charging enforcement function application on the mobile access terminal to the policy and charging rules function on the policy server on the first wireless network. The amount of data usage on the second wireless network by the mobile access terminal is transmitted by the second wireless network to the first wireless network. The first wireless network verifies the amount of data usage on the second wireless network received from the mobile access terminal correlates to the amount of data usage received from the second wireless network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
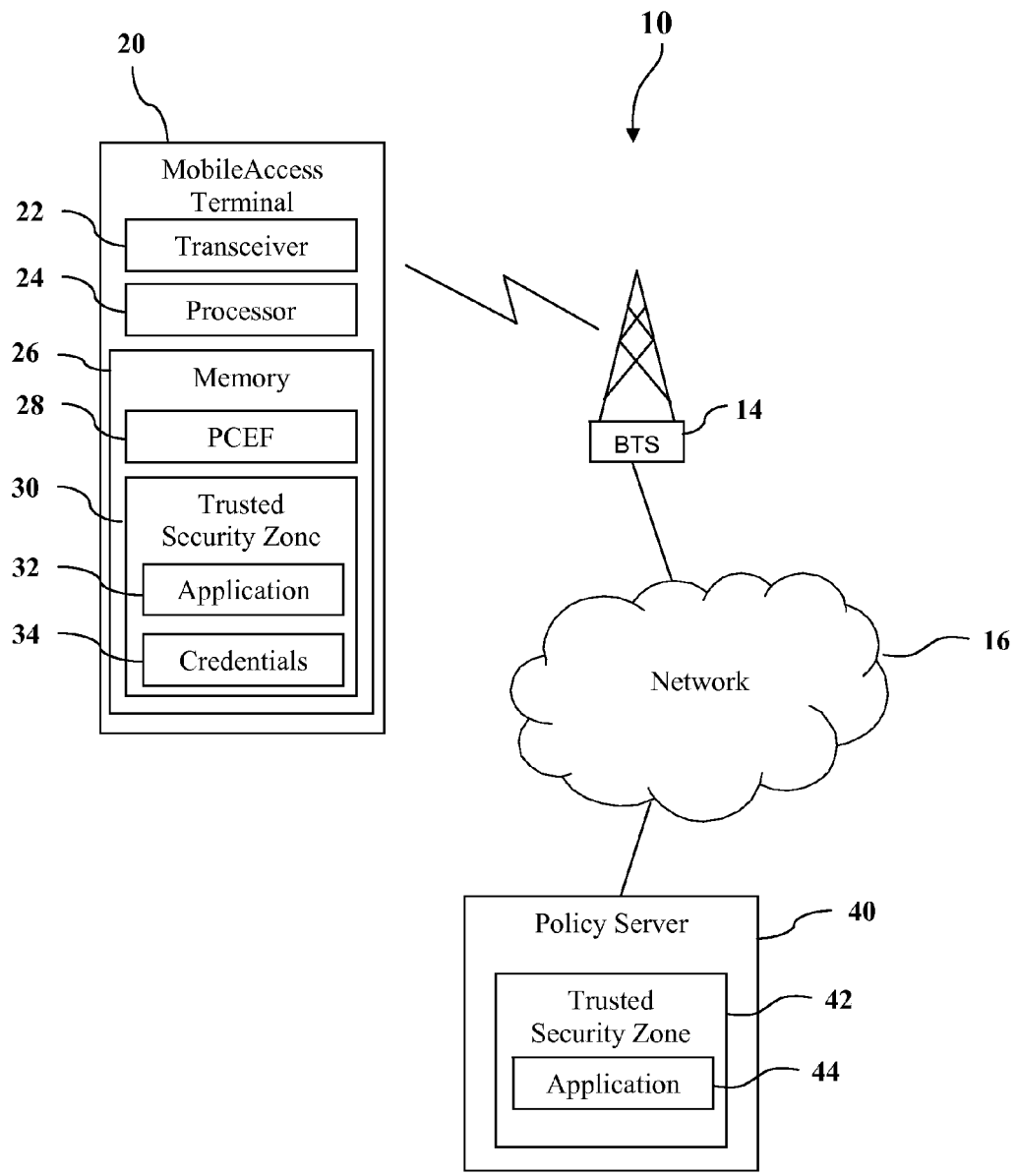
FIG. 1 is a block diagram of a system for policy and charging enforcement function on a mobile access terminal according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Policy and charging rules function (PCRF) may be provided by an application executing on a node in a wireless multimedia network designated to determine real time policy rules for the network. The policy and charging rules function is a software component that traditionally operates at the network core and efficiently accesses subscriber databases and other specialized services, such as charging systems. Because it may operate in real time, the policy and charging rules function has an increased significance and broader potential role than traditional policy engines, which were added on to existing networks rather than built into the network core. Further, as a software component, the policy and charging rules function may provide for a more readily modified, updated, revised policy and charging rules enforcement capability. Some policy and charging rules function applications may support static non-real time or static policy application.

The policy and charging rules function is the part of the network architecture that aggregates information to and from the network, operational support systems, and other sources, supporting the creation rules and then automatically making intelligent policy decisions in real time for each subscriber active on the network. The policy and charging rules function may support multimedia services, quality of service (QoS) levels, and charging rules. For example, the policy and charging rules function may charge subscribers based on their use of high-bandwidth applications, charge extra for quality of service guarantees, limit application usage while roaming, lower bandwidth of wireless subscribers using high-bandwidth applications during peak wireless network access periods, and other. The policy and charging rules function may interface with the main Internet Protocol packet gateway for the wireless network and make charging enforcement decisions on its behalf, acting as a policy decision point (PDP) for the wireless network operator. The policy and charging rules function may create and/or define policy rules and charging rules. One or more policy and charging enforcement function (PCEF) servers may be positioned in the network to perform policy and charging enforcement based on policy rules and charging rules defined by the policy and charging rules function and transmitted to the policy and charging enforcement function servers. The policy and charging rules function and the policy and charging enforcement function are defined in the $3^{rd}$ generation partnership project (3GPP) policy charging control technical specification 3GPP TS 23.203 V9.3.0.

The present disclosure teaches a system and method for extending a policy and charging enforcement function to a mobile access terminal. A policy and charging enforcement function application may be implemented on the mobile access terminal which receives policy rules and charging rules from a policy engine performing the policy and charging rules function for the wireless network. The policy and charging enforcement function application on the mobile access terminal may then act as a policy enforcement point (PEP), enforcing network rules and policies on the communication activities of the mobile access terminal. The policy and charging enforcement function application on the mobile access terminal may identify characteristics of the data traffic and the wireless network and may enforce the policy rules and charging rules based on these characteristics. Enforcing the policy rules and charging rules on the mobile access terminal allows restricting data traffic before it is sent from the mobile access terminal to the wireless network. Extending the policy and charging enforcement function to the mobile access terminal may also allow for more granularity of enforcement than provided at the network level, where data may be aggregated across many mobile access terminals when policy rules and charging rules are enforced. Promoting the mobile access terminal making policy and charging enforcement function decisions on the mobile access terminal can save network resources in some circumstances. For example, when the policy dictates that a high-bandwidth application on the mobile access terminal should not be allowed to access the wireless radio access network (RAN) because a peak usage is being experienced in the wireless radio access network, making this decision locally on the mobile access terminal obviates a call attempt by the mobile access terminal and the congestion in the wireless radio access network is thereby mitigated.

In an embodiment, the policy and charging enforcement function application on the mobile access terminal executes in a trusted security zone on the mobile access terminal and is coupled to a trusted security zone in the wireless network executing the policy and charging rules function. The policy and charging rules function provided by a node in the wireless network is a secure service because it is protected by the appropriate network security elements restricting access to the node. However, the policy and charging rules function itself is not trusted. Although information is hard to access, it is not trusted to ensure only a trusted device or element may access the information. Some services, such as monitoring wireless network data usage by the mobile access terminal, may not be as sensitive and may be performed by a policy and charging enforcement application executing in a normal partition on the mobile access terminal. Other services and policy rules may risk exposing sensitive information, and therefore the policy and charging enforcement function application may be executed in a secure partition on the mobile access terminal. By executing the policy and charging enforcement function in a trusted security zone on both the wireless network and the mobile access terminal, a virtual private network (VPN) can be created between the trusted security zones, credentials may be securely exchanged, and trust may be established between the entities. The policy rules and charging rules may then be sent to the policy and charging enforcement function application on the mobile access terminal while limiting the risk of exposure.

In an embodiment, the policy and charging enforcement application on the mobile access terminal may be used for monitoring wireless network usage. The policy and charging enforcement application may identify the network type, such as cellular or Wi-Fi, and whether there is a policy engine on the wireless network providing policy rules and charging rules to the mobile access terminal. For a wireless network that does not communicate policy rules and charging rules to the mobile access terminal, the policy and charging enforcement function application on the mobile access terminal may monitor data usage on the wireless network. This monitored data usage may be saved and later sent to the policy engine on the wireless network of the service provider for the mobile access terminal. The service provider can then use the monitored data usage to verify billing received from the provider of the monitored wireless network. For example, the service provider for the mobile access terminal may have an agreement in place to allow their customers to roam on the cellular network of a second service provider. Policy rules and charging rules are sent from the policy engine on the service provider network directing the policy and charging enforcement function application on the mobile access terminal to monitor data usage when roaming on the cellular network of the second service provider. The service provider may use the monitored data usage to verify the roaming charges they receive from the second service provider are accurate.

In addition to monitoring data usage while roaming on the second service provider network, the policy rules may be used to throttle the traffic being sent to the network to reduce the data usage and save on roaming charges. Similarly, the service provider for the mobile access terminal may have a service agreement with a provider of Wi-Fi networks, for example allowing access to Wi-Fi networks in airports to the mobile access terminal. Policy rules and charging rules may be defined for Wi-Fi networks that differ from the rules defined for roaming on cellular networks. In an embodiment, the policy rules on the mobile access terminal may restrict functionality on the mobile access terminal. When accessing a wireless network that is not trusted, the policy and charging enforcement function on the mobile access terminal may restrict access to the microphone or camera on the mobile access terminal, or restrict access to corporate email, to enhance the security of the mobile access terminal.

In an embodiment, a policy and charging rules function may be implemented on a Wi-Fi wireless network. The policy and charging rules function on the Wi-Fi network may also be implemented in a trusted security zone, allowing trusted communications between the mobile access terminal and the Wi-Fi network. This may allow services such as a premium service tier to be implemented on the wireless network through the use of policy rules.

In an embodiment, a trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming mainstream features in mobile device chipsets. Providing the trusted security zone in the main mobile device chipset and protecting the hardware root of trust removes the need for separate secure hardware to authenticate the device or user. To ensure the integrity of the applications relying upon trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment.

A complete Trusted Execution Environment (TEE) may be implemented through the use of the trusted security zone hardware and software architecture. The Trusted Execution Environment is an execution environment that is parallel to the execution environment of the main mobile device operating system. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile access terminals and tablets as well as extending to other trusted devices such as sensors, medical devices, point-of-sale terminals, industrial automation, handheld terminals, automotive, etc.

The trusted security zone may be implemented by partitioning all of the hardware and software resources of the mobile device into two partitions: a secure partition and a normal partition. In some contexts, the secure partition may be referred to as a secure world or a secure execution world and the normal partition may be referred to as a non-secure world or a non-secure execution world. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution environment, the main mobile operating system in the normal partition is suspended, and applications in the normal partition are prevented from accessing the secure peripherals and data. This prevents corrupted applications or malware applications from breaking the trust of the device.

The trusted security zone may be implemented by partitioning the hardware and software resources to exist in a secure subsystem which is not accessible to components outside the secure subsystem. The trusted security zone is built into the processor architecture through hardware logic present in the trusted security zone which enables a perimeter boundary between the secure partition and the normal partition. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications may run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors may context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the mobile device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile access terminal so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 10 for policy and charging enforcement function on a mobile access terminal is described. The system 10 comprises a mobile access terminal 20, a base transceiver station 14, a network 16, and a policy server 40. The mobile access terminal 20 comprises a radio transceiver 22, a processor 24, and a memory 26. The memory 26 comprises a policy and charging enforcement function application 28 and a trusted security zone 30, where the trusted security zone 30 comprises an application 32 and credentials 34. In an embodiment, the application 32 may be the policy and charging enforcement function application executing in the trusted security zone 30, rather than the application 28 executing in a normal partition of memory 26. Alternatively, the application may be a portion of the policy and charging enforcement function application executing in the trusted security zone 30 and/or a data portion of the policy and charging enforcement function application stored in the trusted security zone 30. For example, policy rules, charging rules, information related to the policy server 40 and/or a policy and charging rules function application 44, and other confidential information related to the policy and charging enforcement function and/or policy and charging rules function may be stored in the trusted security zone 30. The mobile access terminal 20, may be a mobile phone, a personal digital assistant (PDA), a media player, a laptop computer, a tablet computer, or other network enabled electronic device.

In an embodiment, the base transceiver station 14 provides a wireless communication link to the mobile access terminal 20 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the system 10 may comprise any number of base transceiver stations 14 and any number of mobile access terminals 20. The network 16 may be a public communication network, a private communication network, or a combination thereof.

The policy server 40 comprises a trusted security zone 42 and an application 44 executing in the trusted security zone 42. The application 44 provides the policy and charging rules function for the network 16. The application 44 aggregates information from the network 16 and operational support systems in real time, creates policy rules and charging rules based on the collected information, and makes intelligent policy decisions for each subscriber active on the network. When operating in a trusted security zone 42, the application 44 may establish a trusted communication with the mobile access terminal 20 based on receiving the credentials 34 from the mobile access terminal 20. Once the credentials have been received and the trusted communication established, policy rules and charging rules can be securely sent to the mobile access terminal 20. Although shown executing in the trusted security zone 42, in an embodiment the application 44 may execute outside of the trusted security zone, protected by network security elements restricting access to the policy server 40. When operated outside of the trusted security zone 42, the application 44 may be secure but may not be part of a trusted execution environment. In some contexts, the application 44 may be referred to as a policy and charging rules function application 44 and/or a policy and charging rules function network application.

In an embodiment, the policy and charging enforcement application 28 receives policy rules and charging rules from the application 44 via the radio transceiver 22. When the mobile access terminal 20 initiates a wireless communication over the network 16, the policy and charging enforcement application 28 enforces the received policy rules and charging rules. Enforcing the policy rules and charging rules on the mobile access terminal 20 allows for traffic restrictions or blocking before sending data to the network 16, reducing traffic on the network 16 and reducing the load on the application 44.

In an embodiment, the policy rules and charging rules define services, quality of service levels, and charging rules for the use of the wireless communication network 16. The policy rules define how the mobile access terminal 20 may utilize the network 16. They provide the ability to enable multimedia services for the mobile access terminal 20, such as streaming video or video calling, based on the service plan of the mobile access terminal 20, and allow or restrict access to the feature based on the policy rules. The policy rules may also define quality of service levels for the mobile access terminal 20, allowing greater or less network 16 bandwidth based on the service plan of the mobile access terminal 20. The enforcement of policy rules may limit application usage while roaming and/or lower bandwidth of wireless subscribers using high-bandwidth applications during peak wireless network access period. The charging rules enforce charging rules. For example, the mobile access terminal 20 may purchase a defined amount of data usage on the network 16, and when the mobile access terminal 20 reaches the allotted data usage enforcement of the charging rules block further access to the network 16 until additional data usage is purchased. For example, the charging rules and/or policy rules may charge subscribers based on their use of high-bandwidth applications, charge extra for quality of service guarantees, limit application usage while roaming, reduce bandwidth provided to wireless subscribers using high-bandwidth applications during peak wireless network access periods, and based on other conditions.

In an embodiment, enforcing the policy rules and/or charging rules comprises blocking the wireless communication when specified by the policy rules. The policy rules and/or charging rules may define rules which block access to the network 16, such as the previous example where the mobile access terminal 20 has used their purchased allotment of data. As mentioned above, having the policy and charging enforcement function application 28 executing on the mobile access terminal 20 may reduce the load on the network 16. Another example might be a policy rule that blocks the mobile access terminal 20 from accessing wireless networks other than the network 16. The policy rules and the charging rules may be referred to as the policy and charging rules in some contexts.

In an embodiment, the policy and charging rules are received via the radio transceiver 22 from a trusted device. Establishing a trusted execution environment with a trusted device ensures that the communication of the policy and charging rules is not only secure, but that the policy and charging rules are received from a known device. Exchanging the credentials 34 to identify the mobile access terminal 20 to the trusted device prevents another device from intercepting the communication and attempting to masquerade as the trusted device.

In an embodiment, enforcing the policy and charging rules is based on the type of the wireless communication network 16. The policy and charging rules may have different definitions based on the type of network with which the mobile access terminal 20 is communicating. For instance, the mobile access terminal 20 might be subscribed to a service plan from a service provider of the network 16 and may enforce policy and charging rules based on the service plan when communicating with the network 16. The service provider of the network 16 may also have a roaming agreement with a service provider for another network but may want to limit the data usage of the mobile access terminal 20 on the other network and therefore may provide additional policy and charging rules for the mobile access terminal 20 to enforce when communicating with the other network. The policy and charging rules may further be defined to enforce different restrictions based on the type of wireless communication network, such as whether the communication is with a cellular wireless communication network or a Wi-Fi wireless communication network.

In an embodiment, the system 10 further comprises the policy and charging enforcement function application 28 monitoring the wireless network activities of the mobile access terminal 20. In addition to defining network rules, the policy and charging rules may direct the policy and charging enforcement function application 28 on the mobile access terminal 20 to monitor data usage and activities on the wireless networks with which the mobile access terminal 20 communicates. Monitoring on the mobile access terminal 20 may allow finer granularity than data collected by the network 16, as well as providing the ability to monitor other networks with which the mobile access terminal 20 interfaces.

Figure 2:
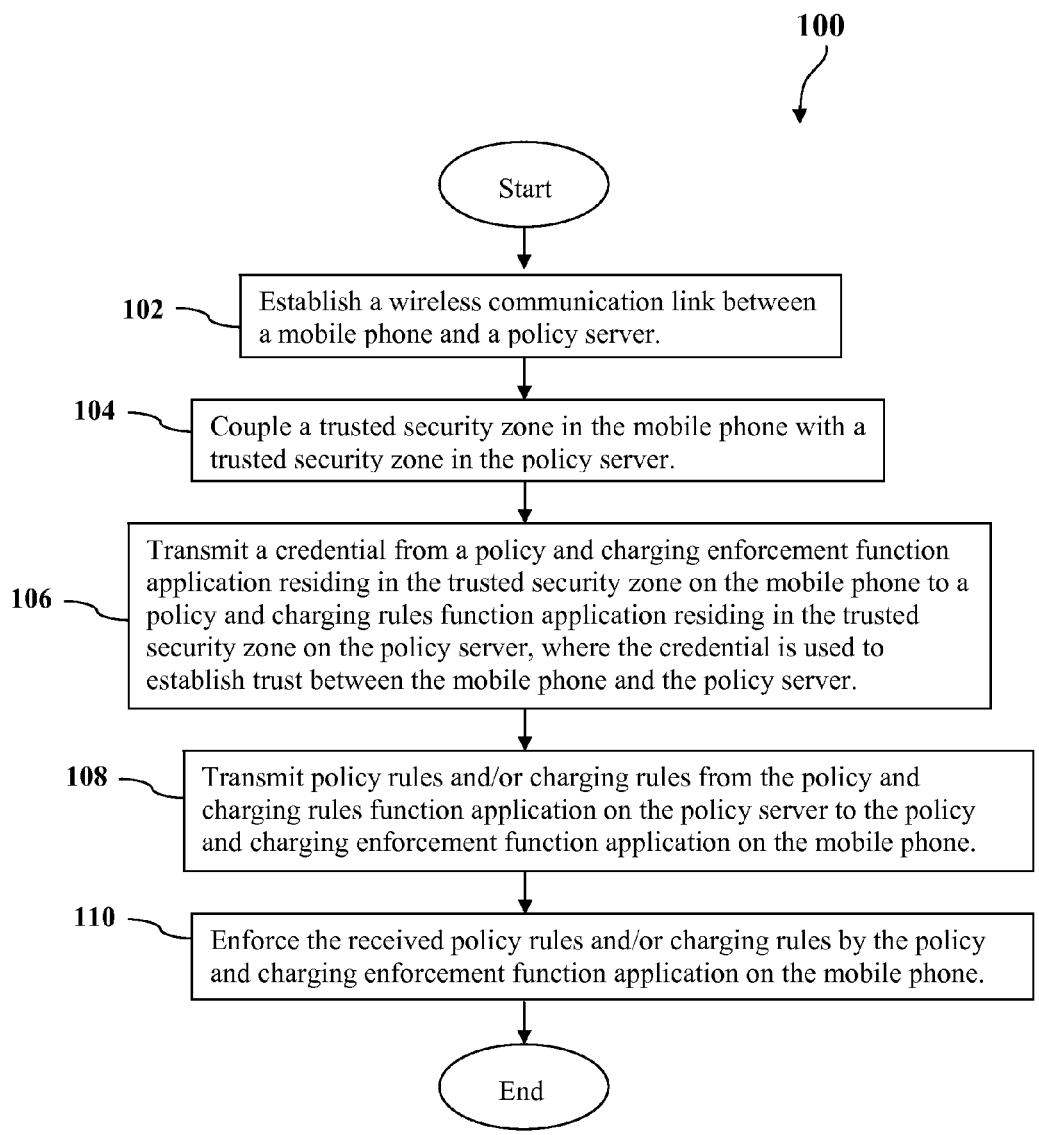
FIG. 2 is a flow chart of a method of trusted policy and charging enforcement function on a mobile access terminal according to an embodiment of the disclosure.

Turning now to FIG. 2, a method 100 of trusted policy charging and rules enforcement function on a mobile access terminal is described. At block 102, a wireless communication link is established between a mobile access terminal 20 and a policy server 40. The policy server 40 defines policy and charging rules for a wireless network 16. At block 104, a trusted security zone 30 in the mobile access terminal 20 is coupled with a trusted security zone 42 in the policy server 40. Coupling between trusted security zones 30, 42 may allow a trusted execution environment to be established between the mobile access terminal 20 and the policy server 40. At block 106, a credential 34 is transmitted from a policy and charging enforcement function application 32 residing in the trusted security zone 30 on the mobile access terminal 20 to a policy and charging rules function application 44 residing in the trusted security zone 42 on the policy server 40, where the credential 34 is used to establish trust between the mobile access terminal 20 and the policy server 40. Alternatively, the credential 34 may be transmitted by a base layer of functionality and/or utilities of the trusted security zone 30 on the mobile access terminal 20 to a base layer of functionality and/or utilities of the trusted security zone 42 of the policy server 40. At block 108, policy and charging rules are transmitted by the policy and charging rules function application 44 on the policy server 40 to the policy and charging enforcement function application 32 on the mobile access terminal 20. Once the credentials 34 have been confirmed and trust has been established between the policy server 40 and the mobile access terminal 20, the policy and charging rules may be securely transmitted to the policy and charging enforcement function application 32 on the mobile access terminal 20. At block 110, the received policy and charging rules are enforced by the policy and charging enforcement function application 32 on the mobile access terminal 20. The policy and charging enforcement function application 32 may extend policy enforcement to the mobile access terminal 20 and restrict traffic before it is sent to the first wireless network 16 based on the received policy rules.

In an embodiment, the wireless communication link between the mobile access terminal 20 and the policy server 40 is established in accordance with a Long Term Evolution (LTE) wireless communication standard. Long Term Evolution is a standard for wireless communication of high-speed data for mobile phones and data terminals. Long Term Evolution allows cellular wireless networks to more efficiently support Internet Protocol-based services and the network architecture allows integration of the policy and charging rules function at the Long Term Evolution network core.

In an embodiment, the method 100 further comprises the policy and charging enforcement function application 28 on the mobile access terminal 20 monitoring wireless network activities and transmitting the monitored statistics to the policy and charging rules function application 44 on the policy server 40. In addition to defining network rules, the policy and charging rules may direct the policy and charging enforcement application 28 on the mobile access terminal 20 to monitor data usage and activities on the wireless networks with which the mobile access terminal 20 communicates. Monitoring on the mobile access terminal 20 may allow finer granularity than data collected by the policy server 40 on the network 16, as well as providing the ability to monitor other networks with which the mobile access terminal 20 interfaces.

In an embodiment, enforcing the received policy and charging rules is based on a time since communicating with the policy and charging rules function application 44 on the policy server 40. The mobile access terminal 20 may share responsibility for rules enforcement with policy server 40 when communicating with the network 16. The received policy and charging rules may instruct the mobile access terminal 20 to take over rules enforcement when communications with the policy server 40 are lost for a period of time.

In an embodiment, enforcing the received policy and charging rules comprises blocking access to a wireless communication network when specified by the policy and charging rules. The received policy and charging rules may define rules which block access to a wireless network. For example, the mobile access terminal 20 might be blocked from accessing a wireless network where the service provider of the network 16 does not have a roaming agreement in place.

In an embodiment, coupling the trusted security zone 30 in the mobile access terminal 20 with the trusted security zone 42 in the policy server 40 comprises creating a virtual private network (VPN). A virtual private network is a secure connection between two endpoints which uses authentication, encryption, and tunneling protocols, where one network protocol encapsulates a different network protocol, to provide a secure path through an untrusted network. Establishing a virtual private network may allow secure transmittal of the credentials 34 and subsequently the policy rules between the mobile access terminal 20 and the policy server 40. Alternatively, in an embodiment, coupling the trusted security zone 30 in the mobile access terminal 20 with the trusted security zone 42 in the policy server 40 comprises establishing a trusted end-to-end communication link between the trusted security zone 30 on the mobile access terminal 20 and the trusted security zone 42 in the policy server 40. For further details about establishing trusted end-to-end communication links, see U.S. patent application Ser. No. 13/532,588, filed Jun. 25, 2012, entitled "End-to-end Trusted Communications Infrastructure," by Leo Michael McRoberts, et al., which is incorporated by reference in its entirety.

Figure 3:
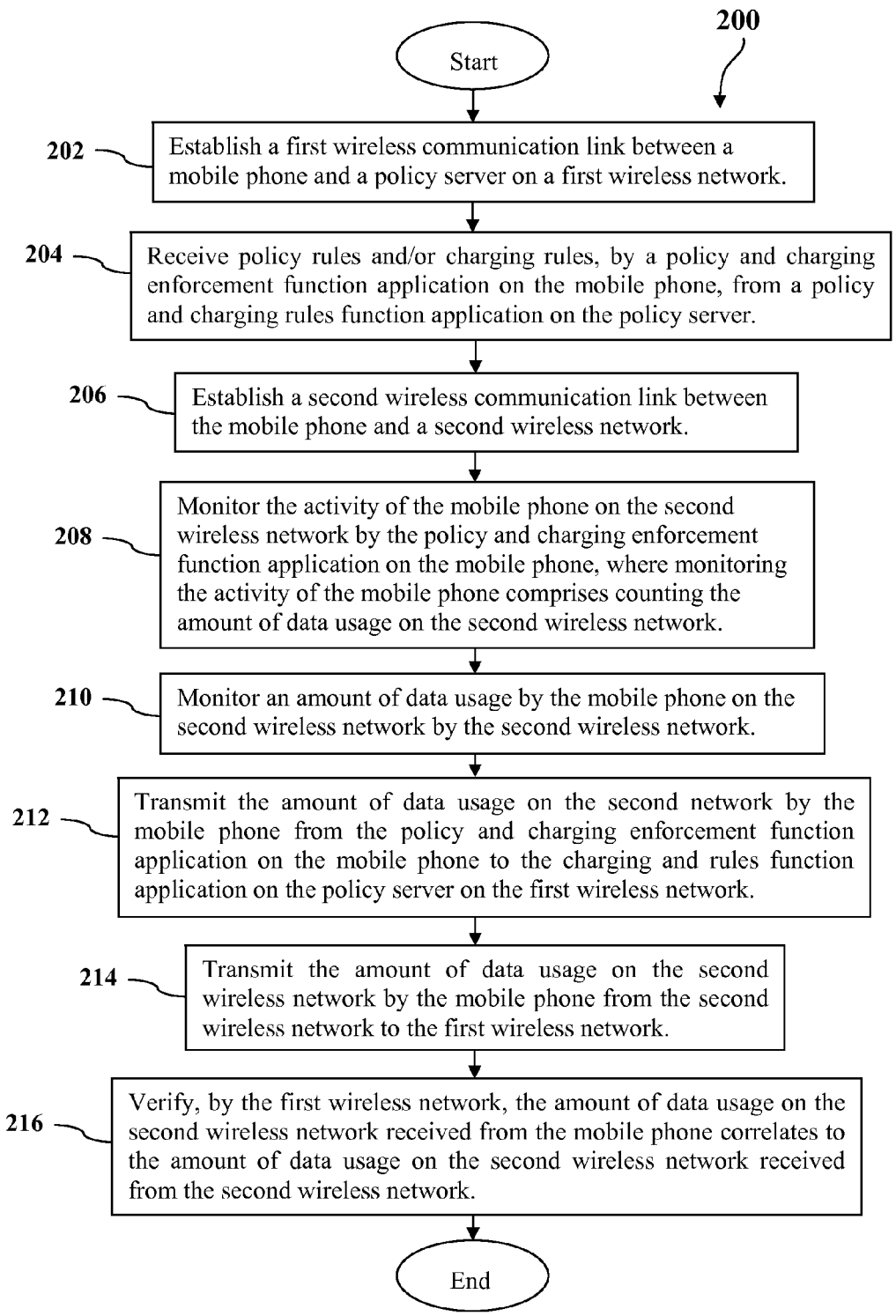
FIG. 3 is a flow chart of a method of monitoring and rating network usage on a mobile access terminal according to an embodiment of the disclosure.

Turning now to FIG. 3, a method 200 of monitoring and rating network usage on a mobile access terminal 20 is described. At block 202, a first wireless communication link is established between a mobile access terminal 20 and a policy server 40 on a first wireless network 16. The policy server 40 defines policy and charging rules for the first wireless network 16. At block 204, policy and charging rules are received by a policy and enforcement function application 28 on the mobile access terminal 20 from a policy and charging rules function application 44 on the policy server 40. The policy and charging rules function application 44 sends policy and charging rules to the mobile access terminal 20 to extend policy support to the mobile access terminal 20 and reduce load on the first wireless network 16. At block 206, a second wireless communication link is established between the mobile access terminal 20 and a second wireless network. The mobile access terminal 20 may be out of range of the first wireless network 16 and may utilize the second wireless network for internet connectivity. At block 208, the activity of the mobile access terminal 20 on the second wireless network is monitored by the policy and charging enforcement function application 28 on the mobile access terminal 20, where monitoring the activity of the mobile access terminal 20 comprises counting the amount of data usage on the second wireless network. The policy and charging rules received from the policy server 40 on the first wireless network 16 may instruct the mobile access terminal 20 to monitor the data usage of the mobile access terminal 20 when utilizing the second wireless network.

At block 210, an amount of data usage by the mobile access terminal 20 on the second wireless network is monitored by the second wireless network. The second wireless network also keeps track of data usage by the mobile access terminal 20 on its network for statistical information and billing purposes. At block 212, the amount of data usage on the second network by the mobile access terminal 20 is transmitted by the policy and charging enforcement function application 28 on the mobile access terminal 20 to the policy and charging rules function application 44 on the policy server 40 on the first wireless network 16. The monitored usage totals are provided by the mobile access terminal 20 to the first wireless network 16 based on the policy and charging rules. At block 214, the amount of data usage on the second wireless network by the mobile access terminal 20 is transmitted by the second wireless network to the first wireless network 16. For example, the second wireless network may send a report of the data usage by the mobile access terminal 20 to the first wireless network 16. The service provider of the second wireless network may have a service agreement with the service provider of the first wireless network 16, and may provide the amount of data usage by the mobile access terminal 20 on the second wireless network as part of the billing based on the mobile access terminal 20 being associated with the service provider of the first wireless network 16. At block 216, the amount of data usage on the second wireless network received from the mobile access terminal 20 is verified to match, within a predefined range of variation, the report of the amount of data usage on the second wireless network received from the second wireless network. The predefined range of variation may be specified as a percentage of the reported usage or as a fixed quantity of data. For example, the range of variation of may be predefined to be about 10%, about 5%, about 2%, or some other predefined range of variation. Alternatively, the range of variation may be predefined to be about 1 Gigabyte, about 100 Megabyte, about 50 Megabyte, about 10 Megabyte, or some other predefined range of variation. In some contexts, matching the data usage within a predefined range of variation as described above may be referred to as correlating the amount of data usage on the second wireless network received from the mobile access terminal to the amount of data usage on the second wireless network received from the second wireless network. The service provider of the first wireless network 16 may use the data usage totals received from the mobile access terminal 20 to verify the amount being billed by the service provider of the second wireless network is correct.

In an embodiment, the method 200 further comprises throttling the data usage of the mobile access terminal 20 on the second wireless network based on a received policy rule. The service provider of the first wireless network 16 may have an agreement with the service provider of the second wireless network allowing the mobile access terminal 20 access to the second wireless network, with the data usage being billed to the service provider of the first wireless network. To limit the cost to the first service provider of providing the access to the second wireless network, a policy rule may sent to the mobile access terminal 20 to restrict the data bandwidth when accessing the second wireless network.

In an embodiment, the method 200 further comprises disabling functionality on the mobile access terminal 20 when accessing the second wireless network based on the received policy and charging rules. For security purposes, it may be desirable to block usage of some features of the mobile access terminal 20 when accessing a public wireless network. For example, the mobile access terminal 20 may be issued by a company to an employee and may provide access to corporate email. To limit exposure of the corporate email to hackers, the received policy and charging rules may restrict access to corporate email when on a public wireless network. The received policy and charging rules may similarly block access to the camera on the mobile access terminal 20 when on the company premises and accessing the corporate Wi-Fi network.

In an embodiment, the policy and charging enforcement function application 28 on the mobile access terminal 20 communicates an indication of a premium subscription to the second wireless network and the second wireless network provides a higher bandwidth to the mobile access terminal 20 based on the premium subscription. The service provider of the first wireless network may have an agreement with the service provider of the second wireless network allowing the mobile access terminal 20 a higher level of service when accessing the second wireless network. The policy and charging rules may define how the mobile access terminal 20 communicates an indication of the premium subscription to the second wireless network, which results in the second wireless network providing a higher bandwidth connection to the mobile access terminal 20.

In an embodiment, the second wireless network is based on the Wi-Fi wireless network standards. Wi-Fi is a commonly used standard allowing a wireless exchange of data over a computer network. Monitoring the data usage of the mobile access terminal 20 on Wi-Fi networks allows the service provider of the first wireless network to collect statistics that would not previously have been available to them. If the service provider of the first wireless network has a service agreement with the service provider of the Wi-Fi network the collected data may allow the first service provider to verify charges billed to them. In an embodiment, the second wireless network is based on the Wi-Fi wireless network standards and further comprises a policy and charging rules function. Incorporating a policy and charging rules function into the Wi-Fi network may allow support for additional services and policy and charging rules on the Wi-Fi network, such as quality of service levels and charging rules.

Figure 4:
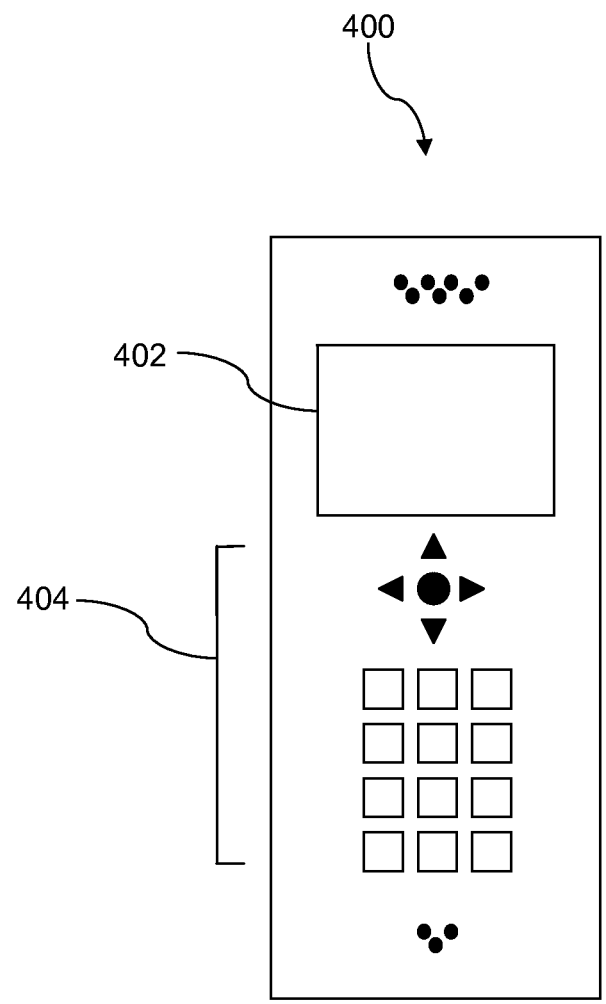
FIG. 4 is an illustration of a mobile access terminal according to an embodiment of the disclosure.

FIG. 4 depicts the mobile access terminal 400, which is operable for implementing aspects of the present disclosure, but the present disclosure should not be limited to these implementations. The mobile access terminal 20 as depicted in FIG. 1 and described previously may be substantially similar to the mobile access device 400. Though illustrated as a mobile phone, the mobile access terminal 400 may take various forms including a wireless handset, a pager, a personal digital assistant (PDA), a gaming device, or a media player. The mobile access terminal 400 includes a display 402 and a touch-sensitive surface and/or keys 404 for input by a user. The mobile access terminal 400 may present options for the user to select, controls for the user to actuate, and/or cursors or other indicators for the user to direct. The mobile access terminal 400 may further accept data entry from the user, including numbers to dial or various parameter values for configuring the operation of the handset. The mobile access terminal 400 may further execute one or more software or firmware applications in response to user commands. These applications may configure the mobile access terminal 400 to perform various customized functions in response to user interaction. Additionally, the mobile access terminal 400 may be programmed and/or configured over-the-air, for example from a wireless base station, a wireless access point, or a peer mobile access terminal 400. The mobile access terminal 400 may execute a web browser application which enables the display 402 to show a web page. The web page may be obtained via wireless communications with a base transceiver station, a wireless network access node, a peer mobile access terminal 400 or any other wireless communication network or system.

Figure 5:
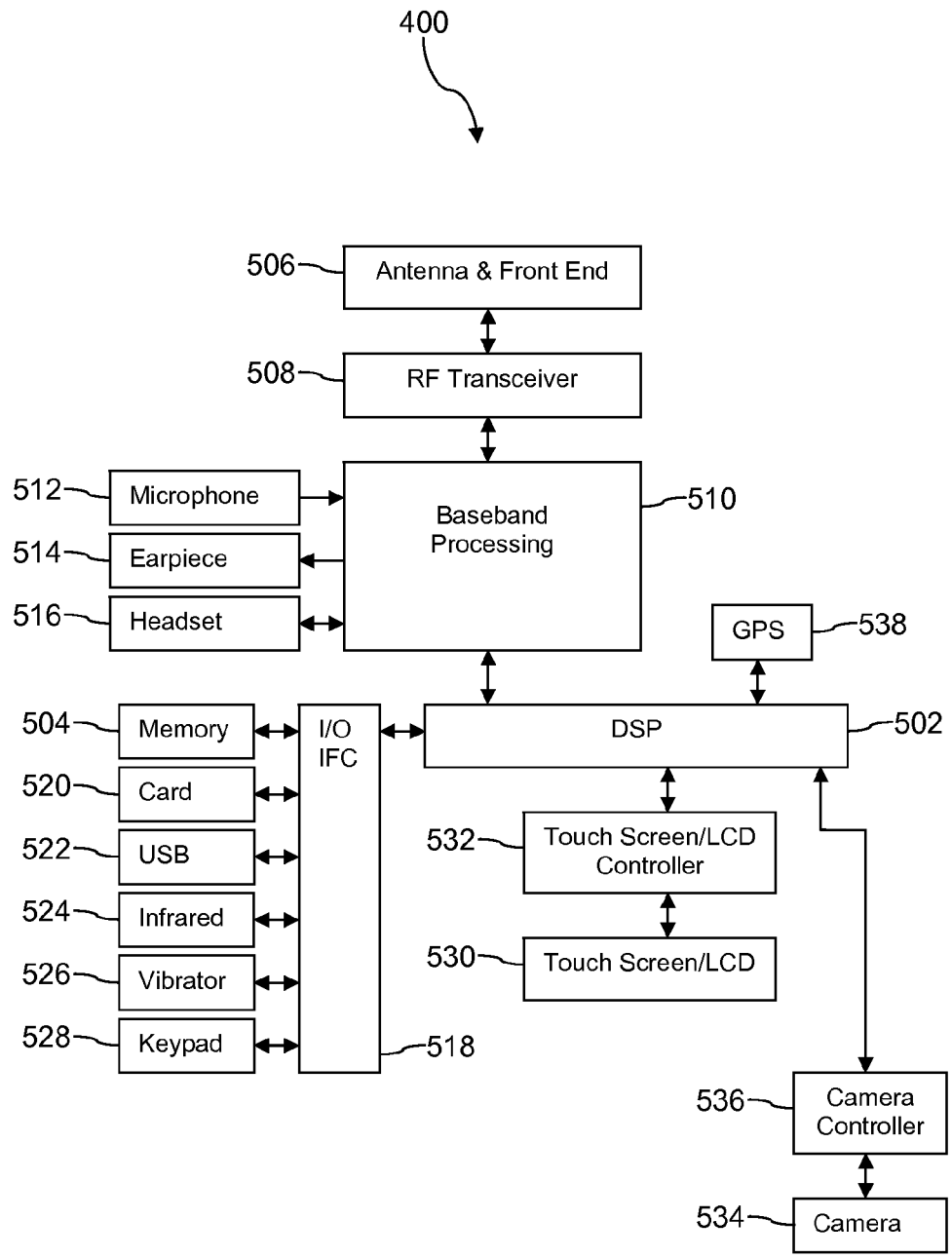
FIG. 5 is a block diagram of a mobile access terminal according to an embodiment of the disclosure.

FIG. 5 shows a block diagram of the mobile access terminal 400. While a variety of known components of handsets are depicted, in an embodiment a subset of the listed components and/or additional components not listed may be included in the mobile access terminal 400. The mobile access terminal 400 includes a digital signal processor (DSP) 502 and a memory 504. As shown, the mobile access terminal 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile access terminal 400 may include another kind of display that does not provide a touch sensitive screen. In an embodiment, the DSP 502 may communicate directly with the memory 504 without passing through the input/output interface 518. Additionally, in an embodiment, the mobile access terminal 400 may comprise other peripheral devices that provide other functionality.

The DSP 502 or some other form of controller or central processing unit operates to control the various components of the mobile access terminal 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile access terminal 400 to function as a peripheral device to exchange information with a personal computer or other computer system. The infrared port 524 and other optional ports such as a Bluetooth® interface or an IEEE 802.11 compliant wireless interface may enable the mobile access terminal 400 to communicate wirelessly with other nearby handsets and/or wireless base stations.

The keypad 528 couples to the DSP 502 via the interface 518 to provide one mechanism for the user to make selections, enter information, and otherwise provide input to the mobile access terminal 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile access terminal 400 to determine its position.

Figure 6A:
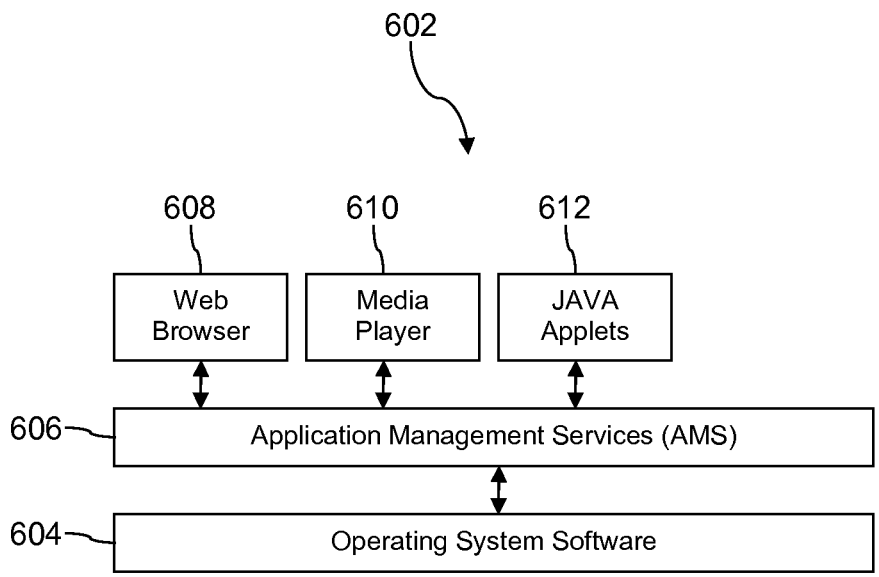
FIG. 6A is a block diagram of a software architecture for a mobile access terminal according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile access terminal 400. Also shown in FIG. 6A are a web browser application 608, a media player application 610, and JAVA applets 612. The web browser application 608 may be executed by the mobile access terminal 400 to browse content and/or the Internet, for example when the mobile access terminal 400 is coupled to a network via a wireless link. The web browser application 608 may permit a user to enter information into forms and select links to retrieve and view web pages. The media player application 610 may be executed by the mobile access terminal 400 to play audio or audiovisual media. The JAVA applets 612 may be executed by the mobile access terminal 400 to provide a variety of functionality including games, utilities, and other functionality.

Figure 6B:
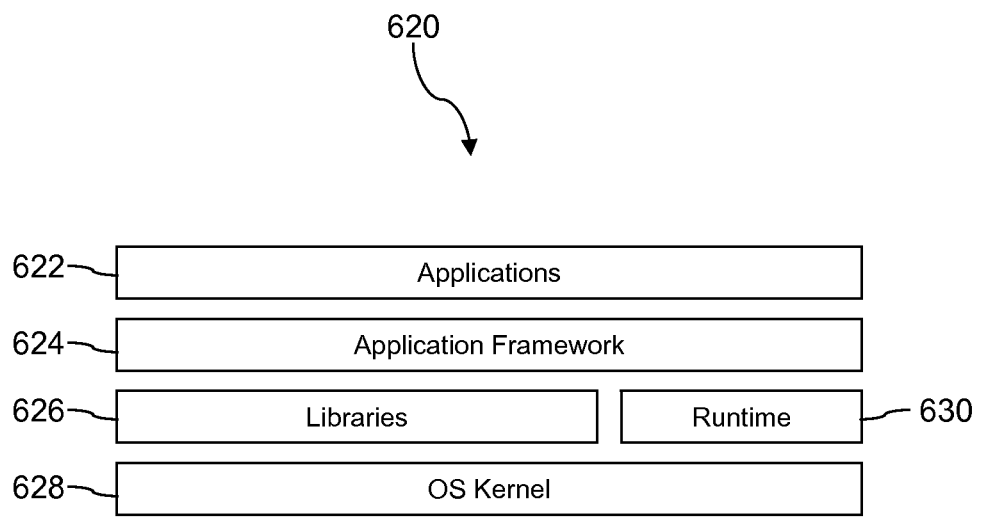
FIG. 6B is a block diagram of a software architecture for a mobile access terminal according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
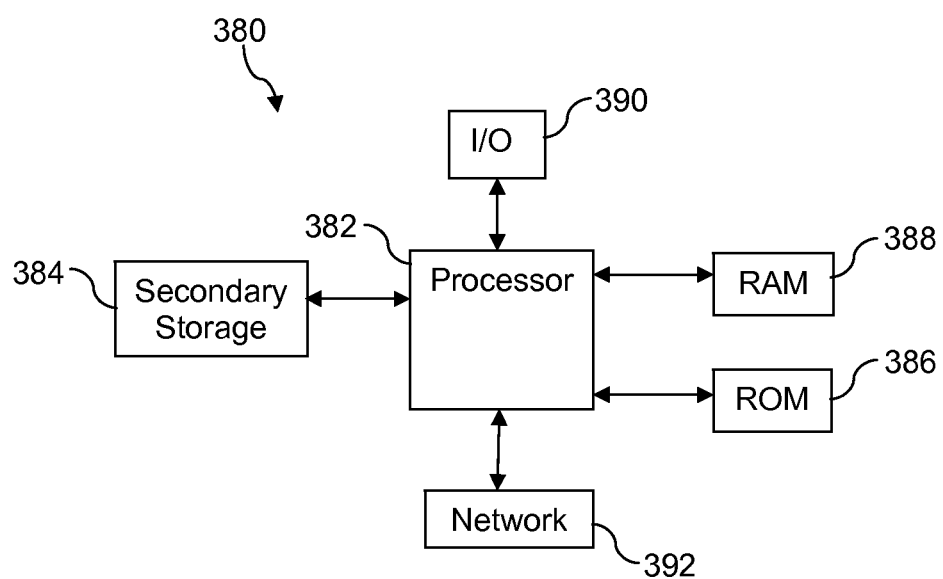
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of trusted policy and charging enforcement function on a mobile communication device, comprising:
    establishing a wireless communication link between a mobile communication device and a policy server;
    coupling a trusted security zone in the mobile communication device with a trusted security zone in the policy server;
    transmitting a credential from a policy and charging enforcement function application residing in the trusted security zone on the mobile communication device to a policy and charging rules function application residing in the trusted security zone on the policy server, wherein the credential is used to establish trust between the mobile communication device and the policy server for accessing the functionality of the mobile communication device;
    transmitting policy rules from the policy and charging rules function application on the policy server to the policy and charging enforcement function application on the mobile communication device;
    enforcing the received policy rules by the policy and charging enforcement function application on the mobile communication device;
    monitoring wireless network activities by the policy and charging enforcement function application on the mobile communication device; and
    transmitting, by the policy and charging enforcement function application on the mobile communication device, the monitored network activities to the policy and charging rules function application on the policy server.

2. The method of claim 1, wherein the wireless communication link between the mobile communication device and the policy server is established in accordance with a Long Term Evolution (LTE) wireless communication standard.

3. The method of claim 1, wherein enforcing the received policy rules is based on a time since communicating with the policy and charging rules function application on the policy server.

4. The method of claim 1, wherein enforcing the received policy rules comprises blocking access to a wireless communication network when specified by the policy and charging rules.

5. The method of claim 1, wherein coupling the trusted security zone in the mobile communication device with the trusted security zone in the policy server comprises creating a virtual private network (VPN).

6. The method of claim 1, wherein enforcing the received policy rules by the policy and enforcement function application comprises enforcing policy rules in place of the policy and charging rules function application on the policy server.

7. A method of monitoring and rating network usage on a mobile communication device, comprising:
- establishing a first wireless communication link between a mobile communication device and a policy server on a first wireless network;
- receiving, by a policy and charging enforcement function application on the mobile communication device, policy rules from a policy and charging rules function application on the policy server on the first wireless network;
- establishing a second wireless communication link between the mobile communication device and a second wireless network;
- monitoring, by the policy and charging enforcement function application on the mobile communication device, the activity of the mobile communication device on the second wireless network, wherein monitoring the activity of the mobile communication device comprises counting the amount of data usage on the second wireless network;
- monitoring, by the second wireless network, an amount of data usage by the mobile communication device on the second wireless network;
- transmitting, by the policy and charging enforcement function application on the mobile communication device, the amount of data usage on the second network by the mobile communication device to the policy and charging rules function on the policy server on the first wireless network;
- transmitting, by the second wireless network, the amount of data usage on the second wireless network by the mobile communication device to the first wireless network; and
- verifying, by the first wireless network, the amount of data usage on the second wireless network received from the mobile communication device correlates to the amount of data usage on the second wireless network received from the second wireless network.

8. The method of claim 7, further comprising throttling the data usage of the mobile communication device on the second wireless network based on a received policy rule.

9. The method of claim 7, further comprising disabling functionality on the mobile communication device when accessing the second wireless network based on the received policy rules.

10. The method of claim 7, wherein the policy and charging enforcement function application on the mobile communication device communicates an indication of a premium subscription to the second wireless network, and wherein the second wireless network provides a higher bandwidth to the mobile communication device based on the premium subscription.

11. The method of claim 7, wherein the second wireless network is based on the Wi-Fi wireless network standards.

12. The method of claim 11, wherein the second wireless network comprises a policy and charging rules function.

\* \* \* \* \*